(12) United States Patent
Kishi

(10) Patent No.: US 9,239,844 B2
(45) Date of Patent: Jan. 19, 2016

(54) DATA DUPLICATION DETECTION SYSTEM AND METHOD FOR CONTROLLING DATA DUPLICATION DETECTION SYSTEM

(71) Applicants: Hitachi, Ltd., Tokyo (JP); Hitachi Information & Telecommunication Engineering, Ltd., Yokohama-shi, Kanagawa (JP)

(72) Inventor: Masayuki Kishi, Kanagawa (JP)

(73) Assignee: HITACHI, LTD., Tokyo (JP)

( * ) Notice: Subject to any disclaimer, the term of this patent is extended or adjusted under 35 U.S.C. 154(b) by 11 days.

(21) Appl. No.: 14/343,644

(22) PCT Filed: Mar. 29, 2013

(86) PCT No.: PCT/JP2013/059462
§ 371 (c)(1),
(2) Date: Mar. 7, 2014

(87) PCT Pub. No.: WO2014/155653
PCT Pub. Date: Oct. 2, 2014

(65) Prior Publication Data
US 2015/0220554 A1 Aug. 6, 2015

(51) Int. Cl.
*G06F 7/04* (2006.01)
*G06F 17/30* (2006.01)
*G06F 3/06* (2006.01)

(52) U.S. Cl.
CPC ........ *G06F 17/30159* (2013.01); *G06F 3/0641* (2013.01); *G06F 17/30156* (2013.01)

(58) Field of Classification Search
CPC ............ G06F 17/30156; G06F 3/0641; G06F 17/30159; G06F 11/1453; G06F 17/30
See application file for complete search history.

(56) References Cited

U.S. PATENT DOCUMENTS 8,868,520 B1 * 10/2014 Raghuwanshi ... G06F 17/30156
707/692
2009/0187546 A1 7/2009 Whyte
(Continued)

FOREIGN PATENT DOCUMENTS

WO 2012/032727 A1 3/2012

OTHER PUBLICATIONS

Zhu, Benjamin, "Avoiding the Disk Bottleneck in the Data Domain Deduplication File System", Proceedings of the 6th USENIX Conference on File and Storage Technologies(Fast '08), USENIX Association, 2008, pp. 1-14. Retrieved from the Internet: <URL:http://www.cs.cmu.edu/~15-610/READINGS/optional/shu2008.pdf>.

*Primary Examiner* — Bruce Moser
(74) *Attorney, Agent, or Firm* — Volpe and Koenig, P.C.

(57) ABSTRACT

Accurate and efficient detection of data duplication is implemented. A data duplication determination part (1A) of a storage system (1) temporarily stores in a pool (4) a target chunk data when a second management table (T2) indicates that the target chunk data, which is included in received data, has already been stored, and, in addition, when data (a fingerprint (FP)) for guaranteeing the identity of the target chunk data is not stored in a third management table (T3). The duplication determination part (1A), in a case where the second management table indicates that another target chunk data that differs from the target chunk is already stored, and, in addition, in a case where determination is made that the FP of the other target chunk data is stored in the third management table, makes a redetermination as to whether the chunk data stored in the pool has already been stored.

14 Claims, 8 Drawing Sheets

(56) References Cited

U.S. PATENT DOCUMENTS

| | | | |
|---|---|---|---|
| 2010/0299490 A1* | 11/2010 | Attarde | G06F 11/1453 711/162 |
| 2011/0225191 A1 | 9/2011 | Xie | |
| 2013/0018853 A1* | 1/2013 | Jayaraman et al. | 707/692 |
| 2014/0279956 A1* | 9/2014 | Trimble | G06F 3/0641 707/692 |
| 2015/0127621 A1* | 5/2015 | Kuo | 707/692 |

\* cited by examiner

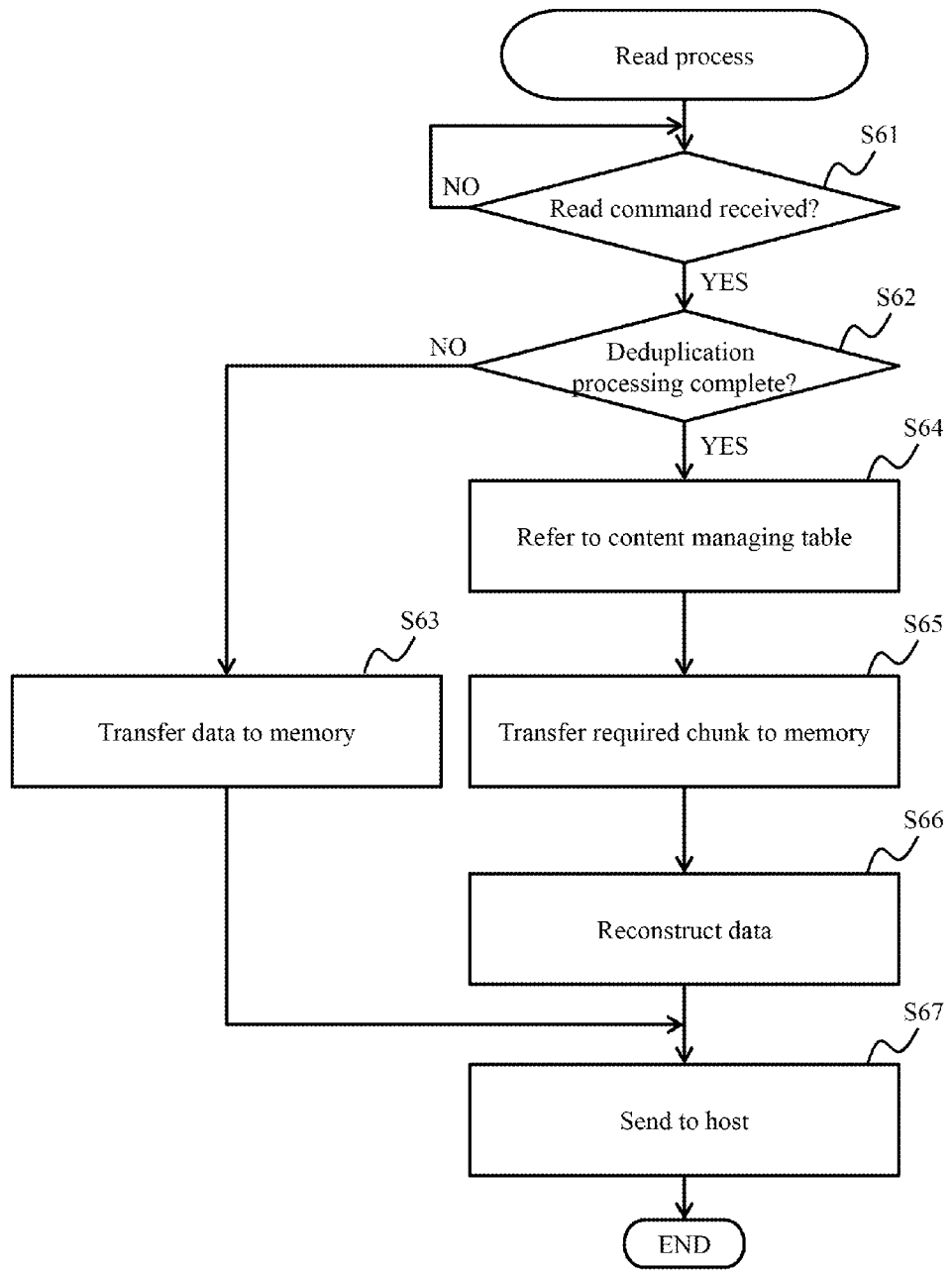

DATA DUPLICATION DETECTION SYSTEM AND METHOD FOR CONTROLLING DATA DUPLICATION DETECTION SYSTEM

TECHNICAL FIELD

The present invention relates to a data duplication detection system and a method for controlling the data duplication detection system.

BACKGROUND ART

The amount of data handled by information processing systems is increasing year by year, and accordingly storage systems with larger capacity are developed to back up the data growing in volume. Backup data often includes the same data as data that has already been stored in the storage system. Therefore, eliminating duplicate data inside backup data makes it possible to effectively utilize the storage resources of a storage system.

In order to check whether identical segments exist in a system, a conventional technique via which a three-stage search is performed to determine (1) whether a segment fingerprint is included in a memory buffer index; (2) whether a segment fingerprint is included in a Bloom filter fo an index; and (3) whether a segment fingerprint is included in an index, is well known (Patent Literature 1).

CITATION LIST

Patent Literature

[PTL 1]
US Patent Application Publication No. 2011/0225191

SUMMARY OF INVENTION

Technical Problem

When the fingerprints of all chunk data are included in a chunk index, the number of fingerprints managed by the chunk index increases, thereby increasing the time required for searches.

To shorten the search time, a method for managing only the fingerprints of representative pieces of chunk data rather than managing the fingerprints of all the chunk data is conceivable. However, in this case, it is not possible to accurately determine the identity of data with respect to chunk data that exists between a certain piece of representative chunk data and another piece of representative chunk data. That is, when there exists data that is identical to chunk data existing between pieces of representative chunk data, that is, chunk data for which a fingerprint is not being managed, it is not possible to discern that the data is the same data. Consequently, a method for managing only the fingerprints of representative chunk data in a chunk index enhances processing speed, but lowers the detection and rejection rates for duplicate data.

With the foregoing problems in mind, an object of the present invention is to provide a data duplication detection system and a method of controlling the data duplication detection system to enable the accurate detection of duplicate data.

Solution to Problem

To resolve the aforementioned problems, a data duplication detection system according to the present invention is for detecting duplicate data, and comprises: a data duplication determination part configured to determine whether each of a plurality of pieces of chunk data formed by dividing a received data is a duplicate of chunk data that has already been stored; a storage part configured to store chunk data that has been determined not to be duplicative by the data duplication determination part; a first management table configured to manage, for each piece of chunk data stored in the storage part, identity guarantee data that indicates a data identity, with the identity guarantee data being associated with storage-destination information that indicates a data storage destination; a second management table created on the basis of the identity guarantee data for the each piece of chunk data stored in the storage part, the second management table being configured to indicate with prescribed reliability that a piece of chunk data is stored in the storage part; and a third management table configured to manage a plurality of chunk data sets formed by grouping together the pieces of chunk data stored in the storage part, the third management table being configured to manage the identity guarantee data for prescribed chunk data that represents each of the plurality of chunk data sets, wherein the data duplication determination part: in a case where the second management table indicates that a target chunk data included in the received data is stored in the storage part, and, in addition, in a case where determination is made that the identity guarantee data for the target chunk data is not stored in the third management table, stores the target chunk data in a temporary storage part for temporarily storing the target chunk data; in a case where the second management table indicates that another target chunk data that differs from the target chunk is stored in the storage part, and, in addition, in a case where determination is made that the identity guarantee data for the other target chunk data is stored in the third management table, determines whether the identity guarantee data for the target chunk data stored in the temporary storage part is stored in the first management table; in a case where determination is made that the identity guarantee data for the target chunk data stored in the temporary storage part is stored in the first management table, determines that the target chunk data stored in the temporary storage part is already stored in the storage part; and in a case where determination is made that the identity guarantee data for the target chunk data stored in the temporary storage part is not stored in the first management table, determines that the target chunk data stored in the temporary storage part is not stored in the storage part.

A first management table may be prepared for each of the plurality of chunk data sets, and the data duplication determination part, upon determining that the other target chunk data is stored in the third management table, may make a determination as to whether the identity guarantee data of the target chunk data that was stored in the temporary storage part is stored in the first management table corresponding to the chunk data set to which the other target chunk data belongs, from among the first management tables of the respective plurality of chunk data sets.

Additional features of the present invention should become clear from the descriptions in the specification and the accompanying drawings. Furthermore, the mode of the present invention can be achieved and realized from an element, a combination of various elements, and the detailed description that follows.

It should be understood that the descriptions in the specification are merely typical examples, and do not in any sense of the term limit either the claims or application examples of the present invention.

BRIEF DESCRIPTION OF DRAWINGS

FIG. 7 is a flowchart showing a process for registering a representative chunk is a chunk index or the like.

FIG. 8 is flowchart showing a process for reconfiguring data in accordance with a read command from a host computer.

DESCRIPTION OF EMBODIMENTS

The embodiment of the present invention will be explained below on the basis of the drawings. In the accompanying drawings, elements that are functionally the same may be displayed using the same number. The accompanying drawings show a specific embodiment and working examples that conform to the principle of the present invention. The embodiment and working examples are for the sake of understanding the present invention, and are not used to interpret the present invention in a limited way.

The embodiment is explained fully and in enough detail for a person skilled in the art to put the present invention into practice, but other examples and/or aspects are possible. It must be understood that the configuration and/or structure can be changed and various elements can be substituted without departing from the scope or intention of the technical idea of the present invention. Therefore, the following description should not be interpreted as being limited thereto.

In addition, the embodiment of the present invention, as will be explained hereinbelow, may be implemented using software running on a general-purpose computer, may be implemented using dedicated hardware, or may be implemented using a combination of software and hardware.

In the following explanation, management information is explained using a table format, but the management information may not be necessarily expressed using a data structure for a table, but rather may be expressed using a list, a DB, a queue or other such data structure, or a different format. Therefore, to show that the management information is not dependent on the data structure, a "table", a "list", a "DB" or a "queue" may simply be called "information".

Hereinbelow, there may be cases where an explanation of processing in the embodiment of the present invention is given having "program" is the subject (doer of the action). Since the stipulated processing is performed in accordance with a program being executed by a processor while using a memory and a communication port (communication control apparatus), the explanation may be given using the processor as the subject. Either all or a portion of a program may be realized using dedicated hardware, and a program may be modularized. Various types of programs may be installed in each computer using a program delivery server or storage media.

Figure 1:
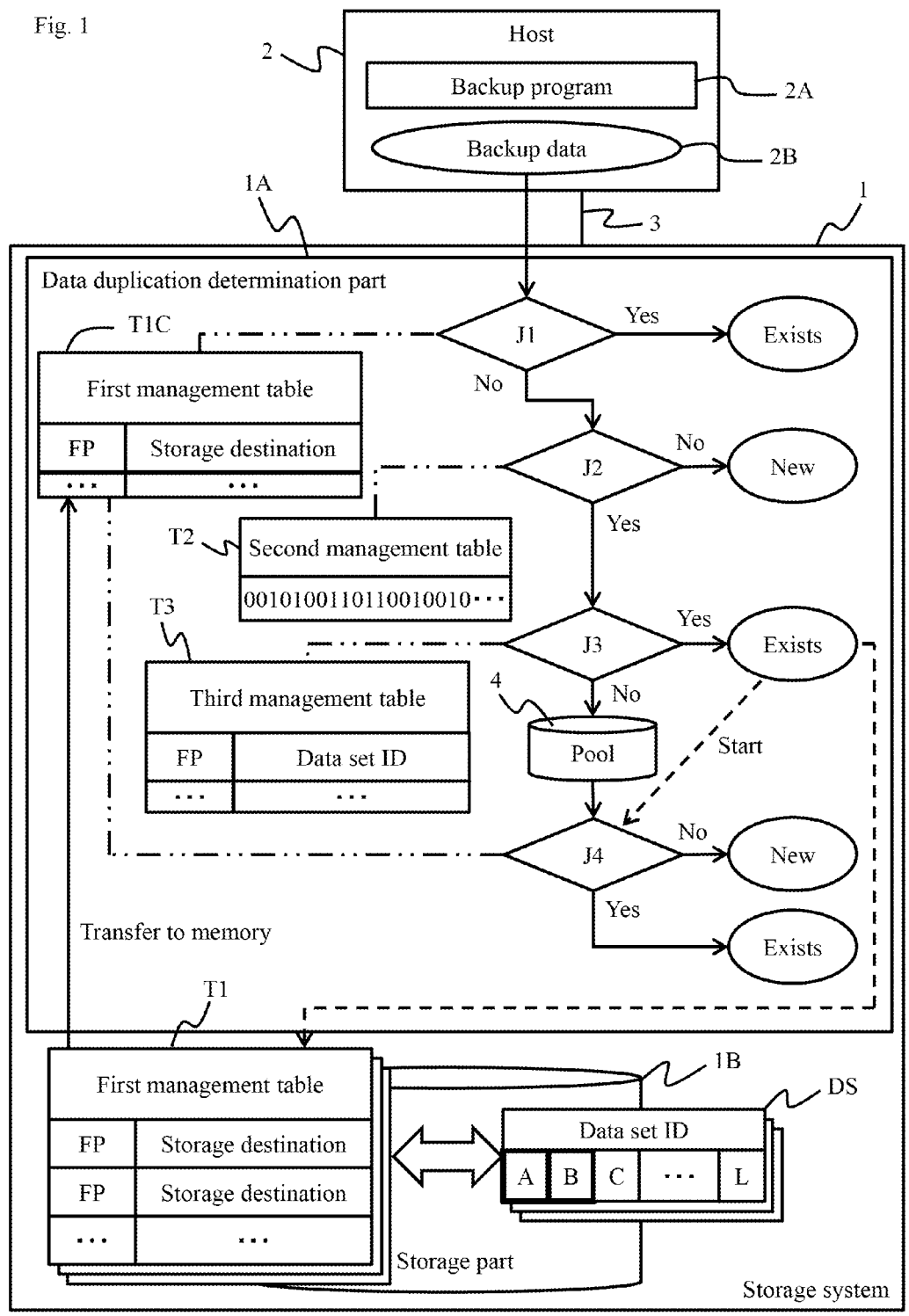
FIG. 1 is an illustrative drawing showing an overview of an embodiment of the present invention.

FIG. 1 is an illustrative drawing showing an overview of the embodiment. An information processing system comprises at least one storage system 1 and at least one host computer 2. The storage system 1 and the host computer 2, for example, may be connected via a communication path using an Internet Protocol (IP) network, a Local Area Network (LAN), a Fibre Channel-Storage Area Network (FC-SAN), or the like.

The host computer 2 will be explained first. The host computer 2, for example, is configured like a backup server, and is provided with a backup program 2A and backup data 2B. The backup program 2A is a computer program for creating a backup of the backup data 2B on a regular or irregular basis.

The configuration of the storage system 1 will be explained. The storage system 1 shown in FIG. 1, for example, comprises a data duplication determination part 1A for determining data duplication, and a storage part 1B. The data duplication determination part 1A comprises a plurality of determination parts J1 to J4, a plurality of tables T1C to T3, and a pool 4.

The storage system 1 manages backup data (also called user data or user files) 2B received from the host computer 2 by dividing the backup data into a plurality of chunks. The data size of the chunks will vary, and the chunk size is appropriately configured in accordance with a data pattern.

A hash value can be obtained by inputting the chunk data into a prescribed hash function. The embodiment uses the hash value as an example of identity guarantee data for guaranteeing the identity of the chunk data. Hereinbelow, the identity guarantee data may also be called a fingerprint, and may be abbreviated as FP. When the FP of a certain piece of data matches the FP of another piece of data, a determination can be made that the two pieces of data are identical.

As shown at the bottom of FIG. 1, the storage system 1 creates a chunk data set DS by grouping together a plurality of chunks. The storage system 1 manages the chunk data in units of chunk data sets. The storage system 1 can reconstruct the user data (backup data) by combining, in a prescribed order, the chunk data distributed among a plurality of chunk data sets.

A first management table T1 manages the chunk data stored in the storage part 1B in an associated manner with storage-destination information indicating the chunk data FPs and the storage destination of the data. The first management table T1 is prepared for each chunk data set and stored in the storage part 1B. From among the first management tables T1 prepared for the respective chunk data sets, a recently used first management table T1 is transferred from the storage part 1B and stored in a memory. In the following explanation, there are cases when the transfer and storage of the first management table T1C in memory (for example, cache memory or system memory) that is used by the data duplication determination part 1A is expressed as "caching the first management table T1". The data duplication determination part 1A uses the first management table T1C stored in memory to execute a first determination J1, which will be described further below.

A second management table T2 is created on the basis of the FP for each piece of chunk data stored in the storage part 1B, and indicates, with prescribed reliability, that the chunk data is stored in the storage part 1B.

The second management table T2 can be configured like a Bloom filter. A Bloom filter can be created by inputting the respective pieces of chunk data stored in the storage part 1B into a prescribed number of hash functions to find hash values, and turning ON the bits in the positions indicated by the hash values. For example, when chunk data having the three hash values "1", "3", and "4" are registered in the Bloom filter, the Bloom filter changes from an initial value of "0000000 . . . n" to "1011000 . . . n". Thus, by turning ON the bits in the positions corresponding to the chunk data hash values of a bit string in the Bloom filter, it is possible to obtain a Bloom filter for determining the existence of chunk data.

In the Bloom filter, when all of the bits corresponding to the hash values (FPs) of the chunk data targeted for investigation are ON, the likelihood that the investigation-target chunk data exists in the storage part 1B is equal to or larger than a fixed value. The probability of the likelihood can be calculated based on the number of hash functions and the number of bits in the Bloom filter. When the determination is that the investigation-target chunk data exists, the probability of the determination being incorrect, that is, the false positive rate is between several percent to ten or so percent.

By contrast, in the Bloom filter, when any one of the bits corresponding to the hash values of the investigation-target chunk data is not ON, the investigation-target chunk data is not stored in the storage part 1B. In this case, the probability that the investigation-target chunk data does not exist in the storage part 1B is 100%.

A third management table T3 manages a plurality of chunk data sets DS formed by grouping together pieces of chunk data stored in the storage part 1B. The third management table T3 manages the FP for a prescribed piece of chunk data that represents the chunk data set. In the third management table T3, for example, two chunks at the head of a user file, two chunks at the head of a chunk data set (also called a container), or the $n^{th}$ chunk counting from the previous representative chunk can be registered as representative chunks. "A" and "B" indicated by the thick black borders at the bottom of FIG. 1 are examples of representative chunks.

The data duplication determination part 1A, upon receiving data constituting the target of a duplication determination, makes a determination in a plurality of stages J1 to J4 described below.

A first determination part J1 determines whether the FP of target chunk data included in received data is stored in the first management table T1C that is stored in the memory. Upon having determined that the target chunk data FP is stored in the first management table T1C, the first determination part J1 determines that the target chunk data is stored in the storage part 1B. The determination result that the target chunk data is already stored data is represented as "exists" in FIG. 1. When the determination result of the first determination part J1 is "No", that is, when the target chunk data FP is not stored in the first management table T1C, the processing advances to a second determination part J2. In the following explanation, there are cases when the fact that the chunk data FP is stored in a table or the like is expressed as "the chunk data FP is registered in a table or the like".

The second determination part J2 determines whether the second management table T2 indicates that the target chunk data is stored in the storage part 1B. When the second management table does not indicate that the target chunk data is stored in the storage part 1B, a determination is made that the target chunk data is new chunk data. The new chunk data is stored in the storage part 1B, and the values of prescribed items in the management tables T1 to T3 are updated.

When the second management table T2 indicates that there is a likelihood that the target chunk data is stored in the storage part 1B, the processing advances to a third determination part J3.

When the second management table indicates that the target chunk data FP is stored in the storage part 1B, the third determination part J3 determines that the target chunk data FP is stored in the third management table T3. As described hereinabove, only the FP of a prescribed chunk (representative chunk) of the chunks in the chunk data set is stored in the third management table T3. When the target chunk data FP is stored in the third management table T3, a determination can be made that the target chunk data is stored in the storage part 1B.

By contrast, when the determination is that the target chunk data FP is not stored in the third management table T3, the determination with respect to the presence or absence of duplicate data is temporarily deferred, and the target chunk data (may also be called the deferred chunk data) is stored in the pool 4.

Although the existence of data that is identical to the target chunk data is being indicated by the second management table T2, there is a high likelihood that the fact that the target chunk data FP cannot be found in the third management table T3 indicates that the target chunk is a chunk other than the representative chunk. Accordingly, in a case like this, in the present embodiment, a decision is made to temporarily defer a decision that the target chunk data is new chunk data and to wait for an opportunity for a re-examination.

A fourth determination part J4 once again determines whether identical data exists with respect to the target chunk data stored in the pool 4. The start of the fourth determination part J4 is timed to coincide with the data duplication determination for another target chunk data.

When the third determination part J3 has determined that another target chunk data FP is stored in the third management table T3, the data duplication determination part 1A transfers the first management table corresponding to the other target chunk data to the memory.

When the third determination part J3 has determined that the other target chunk data FP is stored in the third management table T3, the fourth determination part J4 determines whether the FP of the target chunk data temporarily stored in the pool 4 is stored in the first management table T1C in the memory.

That is, when the first management table T1C in the memory has been updated in accordance with the data duplication determination for the other target chunk data, a final determination is carried out on the basis of the first management table T1C that was stored anew in the memory for the target chunk data for which a determination had been deferred.

When the fourth determination part J4 determines that the target chunk data FP is stored in the first management table T1C, the data duplication determination part 1A deletes from the pool 4 the target chunk data in the pool 4. By contrast, when the fourth determination part J4 has determined that the target chunk data FP is not stored in the first management table T1C, the data duplication determination part 1A determines that the target chunk data temporarily stored in the pool 4 is new chunk data that is not stored in the storage part 1B. The data duplication determination part 1A stores the target chunk data in the storage part 1B, and deletes the target chunk data from the pool 4.

When the pool 4 usage reaches a prescribed upper limit value, the data duplication determination part 1A treats the target chunk data temporarily stored in the pool as new chunk data, and stores the new chunk data in the storage part 1B. The target chunk data stored in the storage part 1B is deleted from the pool 4.

According to the embodiment, which is configured in this manner, a data duplication determination can be performed at high speed by storing only the FP of the representative chunk of a chunk data set in the third management table T3. In addition, according to the embodiment, target chunk data that is not stored in the third management table T3 is stored temporarily in the pool 4 without immediately making a determination that the target chunk data is new chunk data.

Then, in the embodiment, when the first management table T1C in the memory is updated, the first management table T1C is used to determine whether there exists data that is identical to the target chunk data in the pool 4. Therefore, according to the embodiment, it is possible to achieve data duplication determination processing that is both fast and accurate.

In the embodiment, a determination as to whether the target chunk data is already stored data is made on the basis of the FP stored in the first management table T1C in the memory (J1). In addition, in the embodiment, when the FP of the target chunk data is not stored in the first management table T1C in the memory, the second management table T2, which is configured as a Bloom filter, is used to determine whether the target chunk data is already stored (J2). The FP of the representative chunk, as well as the FPs of other chunks are reflected in the second management table T2 of the embodiment.

In the embodiment, a second management table T2 that is capable of indicating the possible existence of duplicate data can be obtained for all chunk data. In the embodiment, when the existence of data identical to the target chunk data has been indicated by the second management table T2, a determination is made as to whether the target chunk data FP is stored in the third management table T3 (J3).

The determinations J1 and J2 can be performed at high speed because the size of the table is relatively small and the table resides in the memory. Since only the FPs of the representative chunk data are registered in the third management table T3, the third management table T3 can be smaller in size than when all the chunk data FPs are registered in the third management table T3. Thus, the processing of the third determination part J3 can be performed at high speed. Therefore, in the embodiment, it is possible to increase the processing speed of the data duplication determinations.

In addition, in the embodiment, when a target chunk is not a representative chunk, the target chunk data decision is deferred temporarily and the target chunk data is stored in the pool 4. Then, in the embodiment, the data duplication determination part 1A waits for the first management table T1C in the memory to be updated, and uses the updated first management table T1C to determine whether the target chunk data in the pool 4 is already stored. In the embodiment, a re-matching process (a process for comparing the target chunk data to data that has already been stored in the storage part 1B) is executed at a separate time for the target chunk data for which a decision has been temporarily deferred like this. Therefore, it is possible to accurately detect already stored data, and to eliminate duplicate data.

In addition, in the embodiment, an opportunity for a re-determination is provided by storing in the pool 4 only that chunk data, from among the chunk data determined to be new data in the initial determination J1, for which the existence of identical data was indicated by the second management table T2. In other words, since target chunk data for which there is no possibility of duplicate data existing is deleted in accordance with the second determination J2, the pool 4 can be used efficiently, and the execution of wasteful re-determinations can be curbed.

In the embodiment, when the pool 4 usage has reached an upper limit value, target chunk data stored in the pool 4 is treated as new data and stored in the storage part 1B. Therefore, it is possible to prevent data duplication determinations from being delayed more than necessary, to make effective use of a limited-size pool 4, and to enhance the efficiency of eliminating data duplication. An example of the embodiment will be explained hereinbelow. In the following explanation, chunk data may be abbreviated as data at times.

Working Example 1

A first working example will be explained using FIGS. 2 to 8. The corresponding relationship with the embodiment shown in FIG. 1 will be explained first. A storage system 10 corresponds to the storage system 1, a host computer 20 corresponds to the host computer 2, a communication path CN corresponds to the communication path 3, a storage part 120 corresponds to the storage part 1B, a chunk pool 134 serving as a "temporary storage part" corresponds to the pool 4, a chunk data set index 132 corresponds to the first management table T1, a Bloom filter 133 corresponds to the second management table T2, a chunk index 136 corresponds to the third management table T3, and a chunk data set 137 corresponds to the chunk data set DS.

Figure 2:
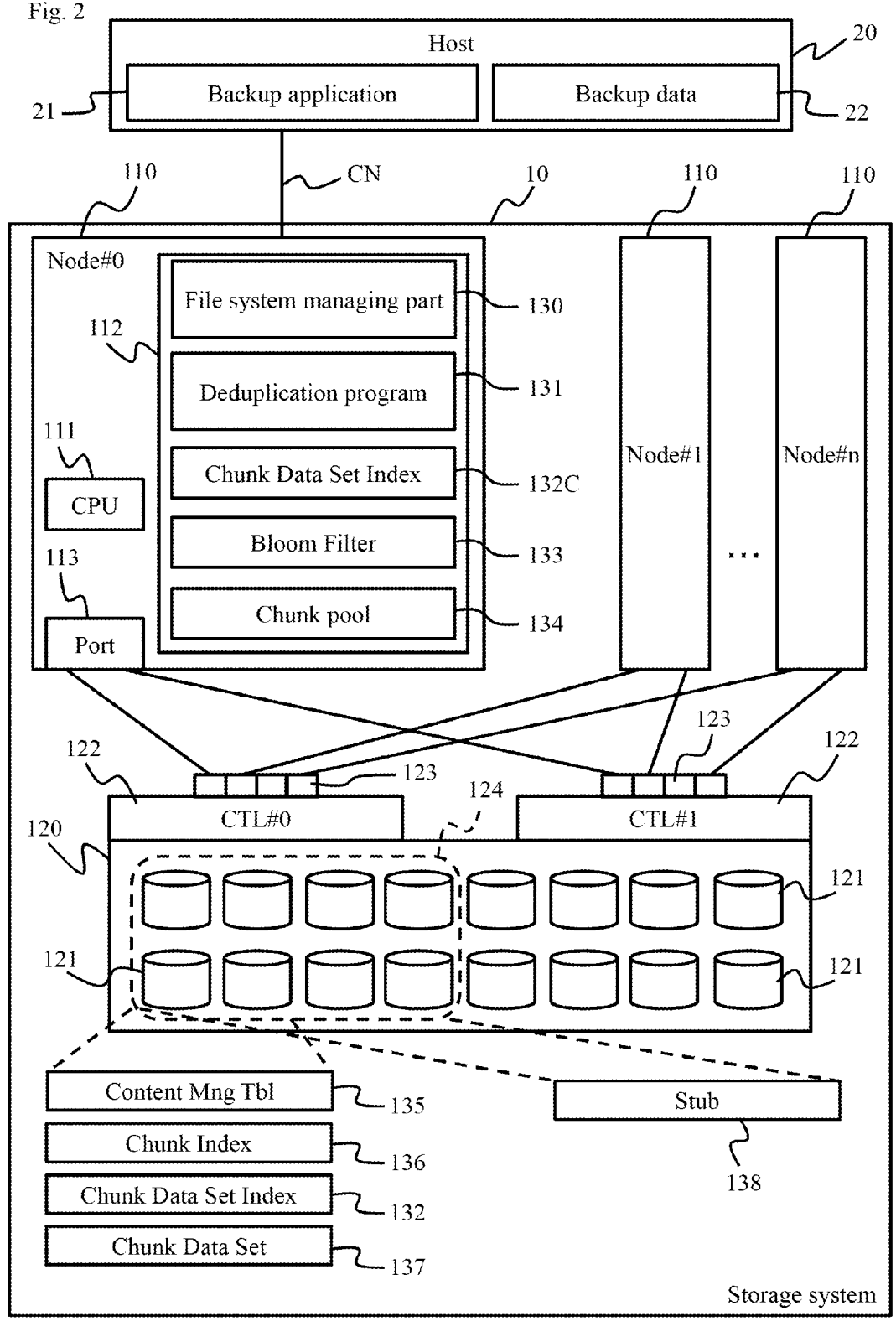
FIG. 2 is a diagram showing the structure of an entire information processing system.

The information processing system shown in FIG. 2 is the same as that described using FIG. 1, and comprises at least one storage system 10 and at least one host computer 20. The storage system 10 and the host computer 20 are connected so as to enable two-way communications via a communication path CN.

The host computer 20, for example, is configured like a backup server. The host computer 20 comprises a storage apparatus for storing a backup application 21 and backup data 22, a microprocessor for executing the backup application 21, and a communication apparatus for communicating with the storage system 10 (neither of which is shown in the drawing). Application is an abbreviation for application program.

The storage system 10 is for storing the backup data of the host computer 20, and has a function for detecting and removing duplicate data when storing the backup data. The storage system 10, for example, has a plurality of nodes 110, and at least one storage part 120 that is used jointly by the plurality of nodes 110. The function for detecting and eliminating duplicated data may be provided inside the storage system 10 as shown in FIG. 2, or may be provided in a separate apparatus from the storage system 10.

The configuration of the storage part 120 will be explained first. The storage part 120 provides a storage area to the storage system 10. The storage part 120 comprises a plurality of storage devices 121, and at least one controller 122 for controlling the plurality of storage devices 121. The controller 122 comprises at least one communication port 123. The controller 122 is connected so as to enable two-way communications with at least one node 110 via the communication port 123. In other words, the nodes 110 can communicate with the plurality of controllers 122 via respectively different communication paths. Therefore, even when a failure occurs in either one communication path or one controller 122, each node 110 can access a storage device 121 inside the storage part 120 using another communication path and another controller 122.

A variety of storage devices capable of reading and writing data, such as, for example, a hard disk device, a semiconductor memory device, an optical disk device, and a magneto-optical disk device can be used as the storage device.

When a hard disk device is used as the storage device, for example, a Fibre Channel (FC) disk, a Small Computer System. Interface (SCSI) disk, a SATA disk, an AT Attachment (ATA) disk, or a Serial Attached SCSI (SAS) disk can be used.

Also, for example, a variety of storage devices, such as a flash memory, a Ferroelectric Random Access Memory (Fe-RAM), a Magnetoresistive Random Access Memory (MRAM), an Ovonic Unified Memory or other phase-change memory, or a RRAM (registered trademark) can also be used. In addition, for example, a configuration that intermixes different types of storage devices, like a flash memory and a hard disk drive, may also be used.

An arbitrary-size logical volume, which is a logical storage area, can be created using the physical storage area of either one or a plurality of storage devices 121. Data can be stored in a logical volume in a redundant configuration such as, for example, a Redundant Arrays of Inexpensive Disks (RAID) 1, RAID 5 or RAID 6.

For example, a file system 124 is provided in a storage area formed using a plurality of storage devices 121. In the file system 124, for example, there is stored a content managing table 135, a chunk index 136, a chunk data set index 132, a chunk data set 137, and a stub file 138.

The configuration of the node 110 will be explained. The node 110, for example, is a computer apparatus that includes a microprocessor 111, a memory 112, and a communication port 113. The memory 112 shown in the drawing includes a system memory, a cache memory, an auxiliary storage device, and so forth.

In the memory 112, for example, there is stored a file system managing part 130, a deduplication program 131, a chunk data set index 132C, a Bloom filter 133, and a chunk pool 134.

The file system managing part 130 is a computer program for managing the file system 124. The deduplication program 131 is a computer program for detecting whether there is a match between received data (input data) and data already stored in the storage part 120, eliminating duplicate data, and storing new data in the storage part 120. The deduplication program 131 corresponds to the essential part of the deduplication part 1A shown in FIG. 1.

Figure 3:
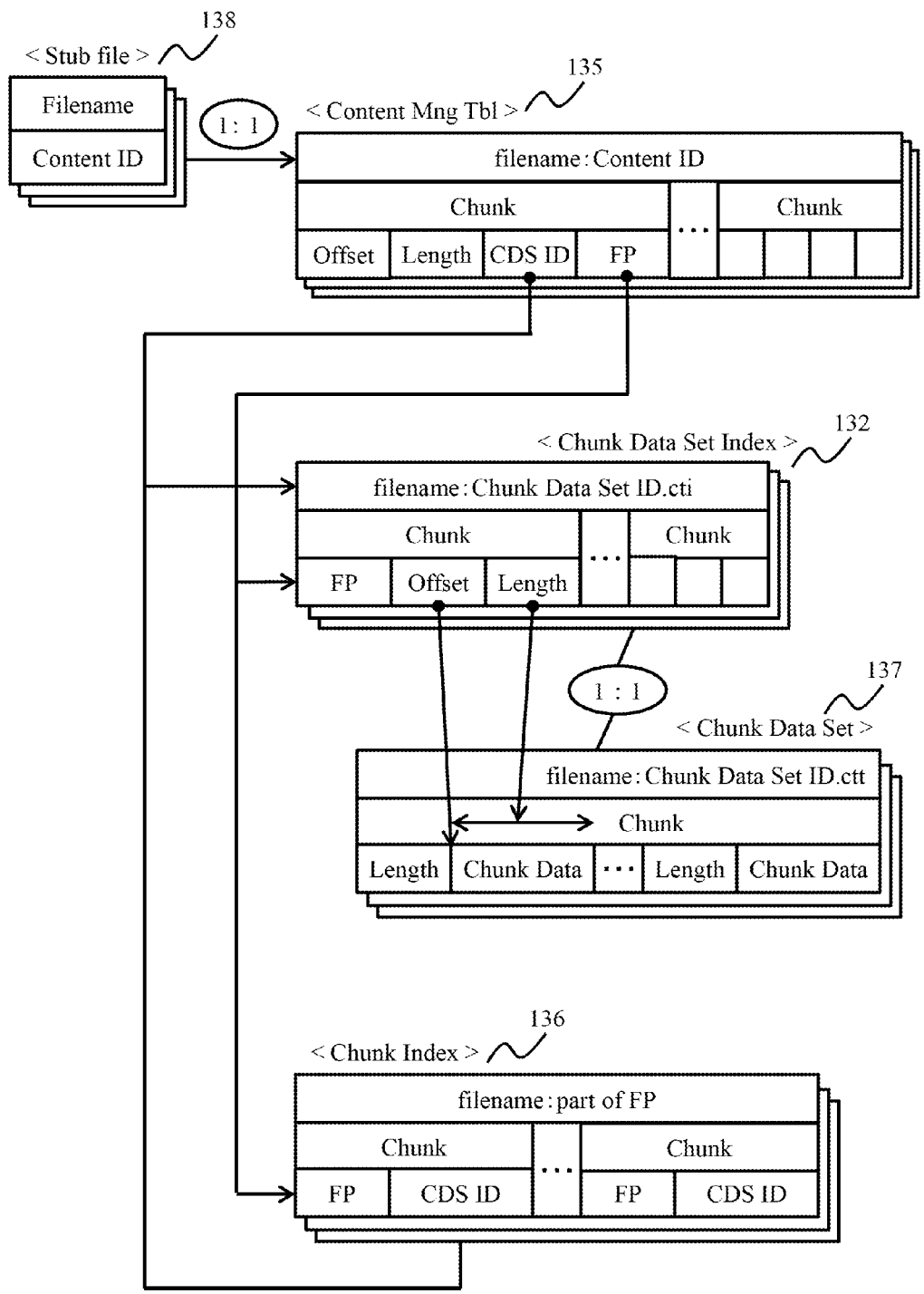
FIG. 3 is an illustrative drawing showing a table structure.

A data management structure will be explained using FIG. 3. A user file received from the host computer 20 as backup data is identified using a content identifier. The user file is managed as a stub file 138 in the file system 124. The stub file 138 has a content identifier, and comprises chunk data stored in a distributed manner in the file system 124.

A content managing table 135 is provided for each stub file 138, and corresponds on a one-to-one basis to the stub file. The content managing table 135 has a content identifier for identifying a stubbed user file, and includes data for managing the chunks comprising this user file.

The management data of each chunk, for example, comprises a content offset value (offset), a chunk length (length), a chunk data set identifier (CDS ID), and a fingerprint (FP).

The content offset value indicates the location of the chunk in the user file. The chunk length indicates the data size of the chunk. The chunk data set identifier is information for identifying a chunk data set managed by grouping together chunks. The fingerprint (FP) is information for identifying a chunk in a chunk data set identified using the chunk data set identifier. By using the content managing table 135, it is possible to ascertain the chunk data set-managed chunks comprising the user file.

The chunk data set (CDS) 137 is chunk data that is grouped together and managed, and has an identifier for identifying the chunk data set. The chunk data set 137 can also be called a container that accommodates a plurality of chunks. The chunk data set 137, for example, includes a plurality of chunks identified from a set comprising a chunk data length (length) and chunk data.

The chunk data set index (CDS IDX) 132 is information for managing the chunk data set 137, and has a chunk data set identifier. The CDS IDX 132 is provided for each chunk data set, and corresponds on a one-to-one basis to the chunk data set 137. The CDS IDX 132 manages in an associated manner a chunk data FP, an offset value indicating the location of a piece of chunk data in the chunk data set, and a chunk data length for each piece of chunk data included in the chunk data set.

The chunk index 136 is information for managing representative chunk data selected using a prescribed criterion from among all the chunk data managed by the storage system 10. The chunk index 136 manages in an associated manner a representative chunk data FP and the chunk data set identifier for identifying the chunk data set 137 to which the representative chunk belongs for each representative chunk.

A case in which the FP of the chunk data (processing-target chunk data) included in the received data exists in the chunk index 136 signifies that the processing-target chunk data is registered in the chunk index 136 as a representative chunk. By referring to the CDS IDX 132 on the basis of the chunk data set identifier associated with the representative chunk, it is possible to detect all the other chunk data included in the chunk data set 137 to which the representative chunk belongs.

Figure 4:
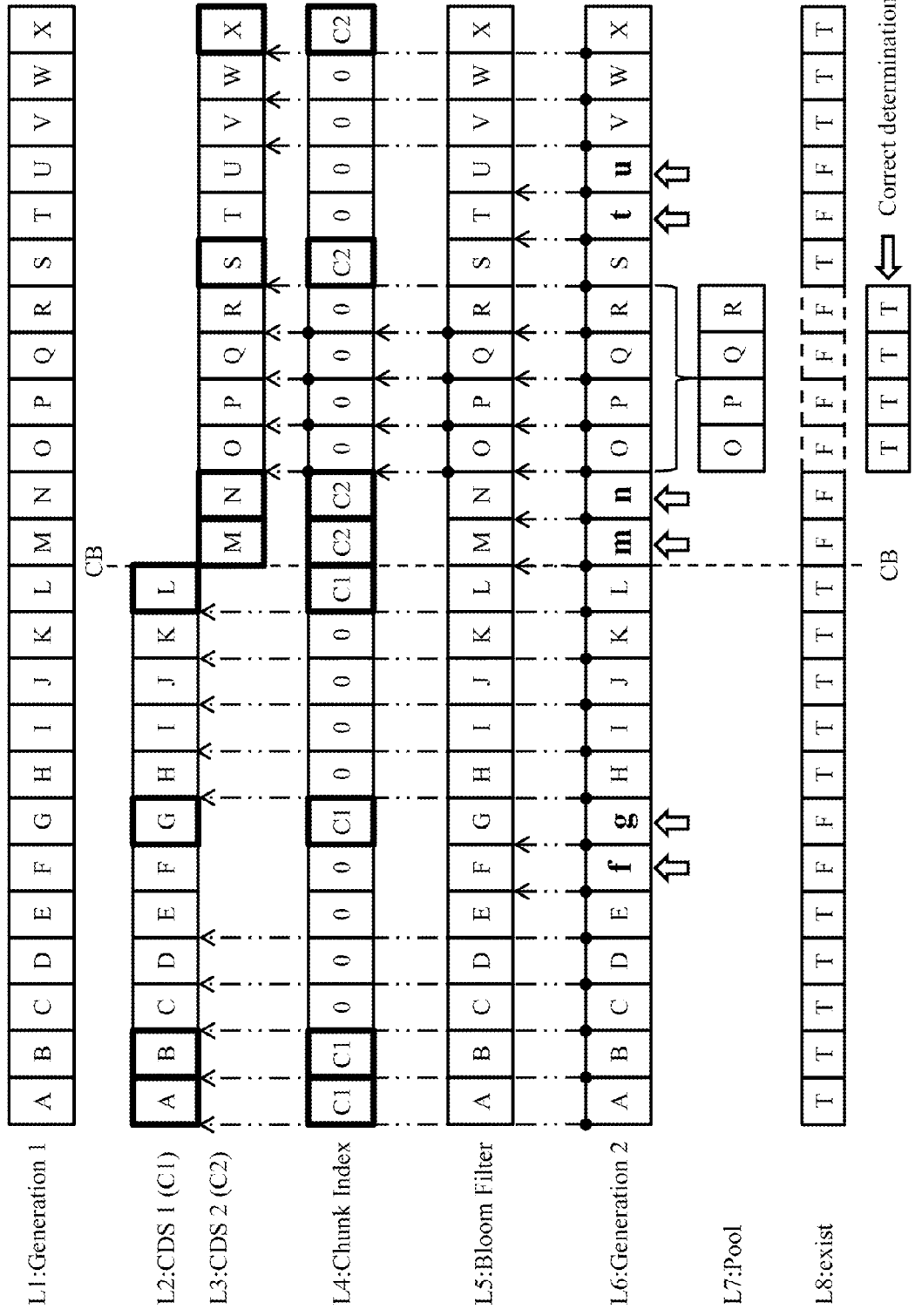
FIG. 4 is an illustrative drawing schematically showing an overview of a method for determining data duplication.

An overview of a method for detecting duplicate data will be explained using FIG. 4. FIG. 4 will be used to explain a case in which second-generation backup data is received from the host computer 20 after all first-generation backup data received from the host computer 20 has been stored in the storage part 120. The storage system 10 stores in the storage part 120, from among the second-generation backup data, data other than data shared in common with the first-generation backup data. The data shared in common with the first-generation backup data among the second-generation backup data can be replaced by a chunk data set identifier and an FP for accessing the common data.

The first row L1 of FIG. 4 shows the first-generation backup data. The first-generation backup data comprises a plurality of chunks from "A" to "X", and it is supposed that the data of each chunk is new data as far as the storage system 10 is concerned. Therefore, all of the first-generation backup data is stored in the storage part 120 of the storage system 10.

The second row L2 shows how the first-generation backup data is divided into two chunk data sets 137 for storing in the storage system 10. A first chunk data set CDS1 accommodates data from chunks "A" to "L". A second chunk data set CDS2 accommodates data from chunks "M" to "X" following the chunks accommodated in the first chunk data set.

As indicated by the thick black borders in the second row L2 and the third row L3, a plurality of representative chunks is selected in each of the chunk data sets CDS1 and CDS2. In the first chunk data set CDS1, the two leading chunks "A" and "B", chunk "G", which is a prescribed value (for example, 5) from the preceding representative chunk "B", and chunk "L", which is the prescribed value from chunk "G", are selected as the representative chunks. In the second chunk data set CDS2, "M", "N", "S" and "X" are selected as the representative chunks in accordance with the same criteria as described above.

The fourth row L4 shows the configuration content of the chunk index 136. The FPs of the representative chunks selected in the second row L2 and the third row L3 are registered in the chunk index 136 in an associated manner with the identifiers of the chunk data sets to which the respective representative chunks belong. The chunk index 136, for example, stores the identifier "C1" identifying the first chunk data set CDS1 in an associated manner with the FP of representative chunk "A". Similarly, the identifier "C1" of the first chunk data set CDS1 is associated with the FPs of representative chunks "B", "G" and "L" and stored in the chunk index 136.

Similarly, for the representative chunks of the second chunk data set CDS2 as well, the identifier "C2" of the second chunk data set CDS2 is associated with the FPs of representative chunks "M", "N", "S", and "X" and stored in the chunk index 136.

The fifth row L5 shows the registration status of the chunk data in the Bloom filter 133. In the Bloom filter 133, the bits corresponding to a prescribed number of hash values obtained for all the chunk data are turned ON. That is, all of the chunk data managed by the storage system 10 is reflected in the Bloom filter 133.

The sixth row L6 shows the second-generation backup data. The second-generation backup data shown in FIG. 4 includes chunks "A" to "E", "H" to "L", "O" to "S", and "V" to "X" that are shared in common with the first-generation backup data. In addition, the second-generation backup data also includes new chunk data "f", "g", "m", "n", "t", and "u" (indicated by white arrows) that differs from the first-generation backup data.

The detection of duplicate data will be explained by dividing the second-generation backup data into a first-half portion of chunk data "A" to "L" and a latter-half portion of chunk data "m" to "X". The lead chunk data "A" of the second-generation backup data is the initial target chunk data, and a determination is made as to whether or not duplicate data exists.

The FP of the target chunk data "A" is stored in the chunk index 136 as a representative chunk. The existence of the target chunk data "A" is also stored in the Bloom filter 133. Therefore, the storage system 10 is able to determine that the target chunk data "A" is already stored by using the chunk index 136 even though the FP of the target chunk data "A" is not stored in the CDS IDX 132C in the memory 112.

The storage system 10 acquires from the chunk index 136 the chunk data set identifier (CDS ID) associated with the FP of the target chunk data "A". The storage system 10 stores the chunk data set that has the chunk data set identifier in the memory 112.

The CDS IDX 132C to which the initial target chunk data "A" belongs is stored in the memory 112. Therefore, the storage system 10, by using the CDS IDX 132C, is able to determine that the other chunk data "B" to "E" that belong to the same chunk data set CDS1 as the initial target chunk data "A" are already stored.

After having determined that chunk data "E" is already stored, the storage system 10 selects the next piece of chunk data "f" as the processing-target chunk data.

The FP of the target chunk data "f" is not stored in the chunk data index 132C in the memory 112, and the existence of the chunk data "f" cannot be detected even from the Bloom filter 133. In addition, the target chunk data "f" is also not a representative chunk, and as such, the FP of the target chunk data "f" is not stored in the chunk index 136.

Therefore, the target chunk data "f" is determined to be new chunk data, is stored in a new chunk data set not shown in the drawing, and the new chunk data set is stored in the storage part 120. When the target chunk data "f" is stored, the FP of the target chunk data "f" is stored in the chunk data set 137. In addition, the target chunk data "f" is also reflected in the Bloom filter 133. In the Bloom filter 133, bits in locations corresponding to a plurality of hash values obtained from the target chunk data "f" are turned ON.

Following the chunk data "f", the chunk data "g" is selected as the target chunk data. The target chunk data "g" is processed the same way as the chunk data "f", and as such, the explanation will be omitted.

The storage system 10, after determining that the chunk data "g" is new chunk data and storing the new chunk data, selects chunk data "H" as the target chunk data and makes a determination as to the presence or absence of duplication.

Since the CDS IDX 132C related to the chunk data set 137 to which the chunk data "H" belongs exists in the memory 112, the storage system 10 determines that the target chunk data "H" is already stored. In accordance with the CDS IDX 132C, the other chunk data "I", "J", "K", and "L" following the chunk data "H" are also determined to already be stored in the same way as the processing described for the chunk data "H".

The FP for target chunk data "m", which exceeds the chunk data set boundary CB, is not stored in the chunk data set to which the initial target chunk data "A" belongs. The FP of the target chunk data "m" is not stored in the other CDS IDX 132 or in the chunk index 136, and the existence of chunk data "m" is not registered in the Bloom filter 133 either.

Therefore, the storage system 10 determines that the target chunk data "m" is new chunk data, and stores the new chunk data in the storage part 120. The storage system 10 updates the CDS IDX 132, the Bloom filter 133, and the chunk index 136 with respect to the target chunk data "m". When chunk data "n" has been selected as the target chunk data following chunk data "m", chunk data "n" is processed as described for chunk data "m".

A case in which chunk data "O" is selected as the target chunk data following chunk data "n" will be explained. The CDS IDX 132C stored in the memory 112 is the CDS IDX 132C for the first chunk data set CDS1. Therefore, the FP of the target chunk data "O" is not stored in the CDS IDX 132C in the memory 112.

However, the target chunk data "O", as shown in the third row L3, is stored in the storage part 120 as a part of the first generation backup data. All of the chunk data managed by the storage system 10 is reflected in the Bloom filter 133.

Therefore, the Bloom filter 133 indicates with a probability of equal to or greater than a prescribed value that the target chunk data "O" exists in the storage system 10. Despite the fact that the Bloom filter 133 indicates that the target chunk data "O" is already stored, the FP of the target chunk data "O" is not registered in the chunk index 136.

In this case, there is a high likelihood that the FP of the target chunk data "O" is stored in the CDS IDX 132 in the storage part 120. That is, the target chunk data "O" is not registered in the chunk index 136 due to not having been selected as a representative chunk, but there is a high likelihood that the target chunk data "O" is registered in the CDS IDX 132 as a normal piece of chunk data.

Accordingly, in the embodiment, the target chunk data "O" is temporarily stored in the chunk pool 134 and a final determination is deferred.

As shown in the seventh row L7, the same processing as that described for chunk data "O" is performed for chunk data "P", "Q", and "R" following chunk data "O", and chunk data "P", "Q" and "R" are also stored in the chunk pool 134.

Following chunk data "R" having been stored in the chunk pool 134, chunk data "S" is selected as the target chunk data. The FP of target chunk data "S" is also not stored in the CDS IDX 132C in the memory 112. This is because the target chunk data "S" is chunk data belonging to the second chunk data set CDS2, and the CDS IDX 132 corresponding to the second chunk data set CDS2 has not been transferred to the memory 112 yet.

The Bloom filter 133, in which the existence of all of the chunk data managed by the storage system 10 is reflected, indicates with a fixed probability that the target chunk data "S" is already stored.

As shown in the third row L3 and the fourth row L4, because the target chunk data "S" is in a prescribed location in the second chunk data set CDS2, the target chunk data "S" is selected as a representative chunk. The FP of the target chunk data "S" is stored in the chunk index 136. The storage system 10 learns that the target chunk data "S" is existing data stored in the storage part 120 by referring to the chunk index 136.

In the embodiment, when target chunk data having the same FP as the FP of a piece of representative chunk data stored in the chunk index 136, the CDS IDX 132 related to the chunk data set 137 to which the piece of representative chunk data belongs is transferred to and stored in the memory 112.

The storage system 10, triggered by the updating of the CDS IDX 132 in the memory 112, determines whether or not decision-deferred chunk data stored in the chunk pool 134 is already stored.

The FPs of chunk data "O" to "R" in the chunk pool 134 are stored in the CDS IDX 132C that was transferred to the memory 112 when the target chunk data "S" was processed. Therefore, the storage system 10 determines that the chunk data "O" to "R" in the chunk pool 134 is already stored chunk data.

Following chunk data "S", chunk data "t" and "u" are determined to be new chunk data and stored in the chunk data set the same as was described for chunk data "m".

The FPs of chunk data "V" to "X", which follow chunk data "u", are stored in the CDS IDX 132C in the memory 112, and as such, are determined to be existing chunk data.

The eighth row L8 shows the results of data duplication determinations by the storage system 10. A determination result "T" indicates data that duplicate existing data. A determination result "F" indicates data that does not duplicate existing data. Since there are no problems with the determination results for chunk data other than the chunk data "O" to "R" stored in the chunk pool 134, explanations will be omitted.

At the time point when it is determined that the FPs for the chunk data "O" to "R" stored in the chunk pool 134 are not stored in the chunk index 136, it is possible to treat the chunk data "O" to "R" as new chunk data. The determination results in this case are "F", which are enclosed by a dotted line in the eight row L8.

However, in actuality, the chunk data "O" to "R" stored in the chunk pool 134 are data that is already stored in the storage system 10, and the determination result of "F" is incorrect.

In the working example, as described hereinabove, a determination is made that there is a likelihood of the duplication determination being in error for target chunk data that cannot be found in the chunk index 136 while the Bloom filter 133 is indicating the likelihood of existence, and the data duplication decision is deferred. Then, in the embodiment, when the CDS IDX 132C in the memory 112 is updated, the new CDS IDX 132C is used to determine whether or not the chunk data stored in the chunk pool 134 is already stored. Therefore, in the embodiment, it is possible to prevent an erroneous determination that already stored data is new data, and to eliminate duplicate data.

Figure 5:
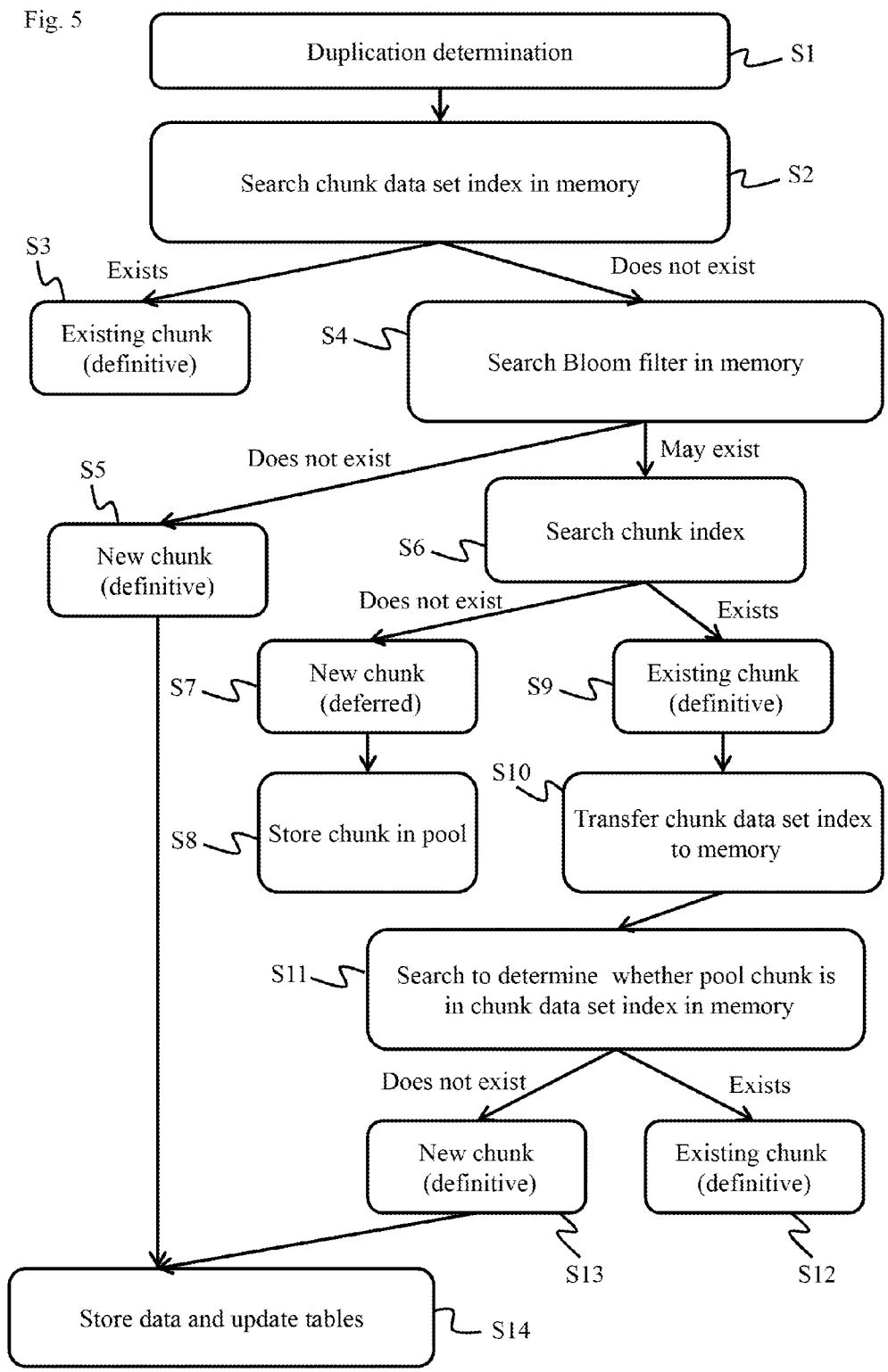
FIG. 5 is a general view of a process for determining data duplication.

FIG. 5 shows an overview of a method for processing a data duplication determination. The entity that executes the data duplication determination process is the deduplication program 131 in a node 110 provided in the storage system 10, and the deduplication program 131 is executed by the microprocessor 111. Therefore, the entity for the data duplication determination process may be any of the storage system, the node, the microprocessor, or the program. The deduplication program 131 will be explained as the operation entity here.

The node 110 starts the process upon receiving data (S1). The program 131 first searches to determine whether the FP of the target chunk data included in the received data exists in the CDS IDX 132C in the memory 112 (S2).

The program 131, upon determining that the FP of the target chunk data is stored in the CDS IDX 132C (S2: exists), determines that the target chunk data is already-stored existing chunk data (S3). The determination result in Step S3 is definitive.

The program 131, upon determining that the FP of the target chunk data does not exist in the CDS IDX 132C in the memory 112 (S2: does not exist), searches the Bloom filter 133 for the existence of the target chunk data (S4).

The program 131, upon determining that the Bloom filter 133 does not indicate the existence of the target chunk data (S4: does not exist), determines that the target chunk data is not stored in the storage system 10 (S5). This determination result is definitive.

The program 131, upon determining that the Bloom filter 133 indicates the existence of the target chunk data (S4: may exist), searches the chunk index 136 that manages the FPs of the representative chunks (S6).

The program 131, upon determining that the FP of the target chunk data is not stored in the chunk index 136 (S6: does not exist), defers the target chunk data decision (S7), and stores the target chunk data in the chunk pool 134 (S8). In other words, for the time being the program 131 treats the target chunk data as though the target chunk data were new chunk data, but this determination is not definitive, and the processing (storing in the storage part 120, updating the various tables, and so forth) in a case where the target chunk data is new chunk data is not yet performed at the time points of Steps S7 and S8.

The program 131, upon determining that the FP of the target chunk data is stored in the chunk index 136 (S6: exists), determines that the target chunk data is existing chunk data (S9). This determination result is definitive.

The program 131, upon determining that the FP of the target chunk data exists in the chunk index 136 (S9), transfers and stores in the memory 112 the CDS IDX 132 corresponding to the chunk data set 137 to which the target chunk data belongs (S10).

When the program 131, in the middle of processing, as target chunk data, other chunk data that differs from the target chunk data stored in the chunk pool 134, determines that the other chunk data is the existing chunk data in Step S9, the CDS IDX 132 related to the other chunk data is transferred to the memory 112, and the CDS IDX 132C that exists in the memory 112 is updated (S10).

The program 131 searches to determine whether the FP of the target chunk data stored in the chunk pool 134 is stored in the updated CDS IDX 132C (S11).

The program 131, upon determining that the FP of the target chunk data in the chunk pool 134 is stored in the updated CDS IDX 132C (S11: exists), determines that the target chunk data is existing chunk data (S12). This decision is definitive.

The program 131, upon determining that the FP of the target chunk data in the chunk pool 134 is not stored in the updated CDS IDX 132C (S11: does not exist), determines that the target chunk data is new chunk data (S13). This decision is definitive.

The program 131, upon determining that the target chunk data is new data (new chunk data) in either Step S5 or Step S13, stores the new chunk data in the chunk data set 137. In addition, the program 131 updates the CDS IDX 132, the Bloom filter 133, and the chunk index 136 to the latest values (S14).

Figure 6:
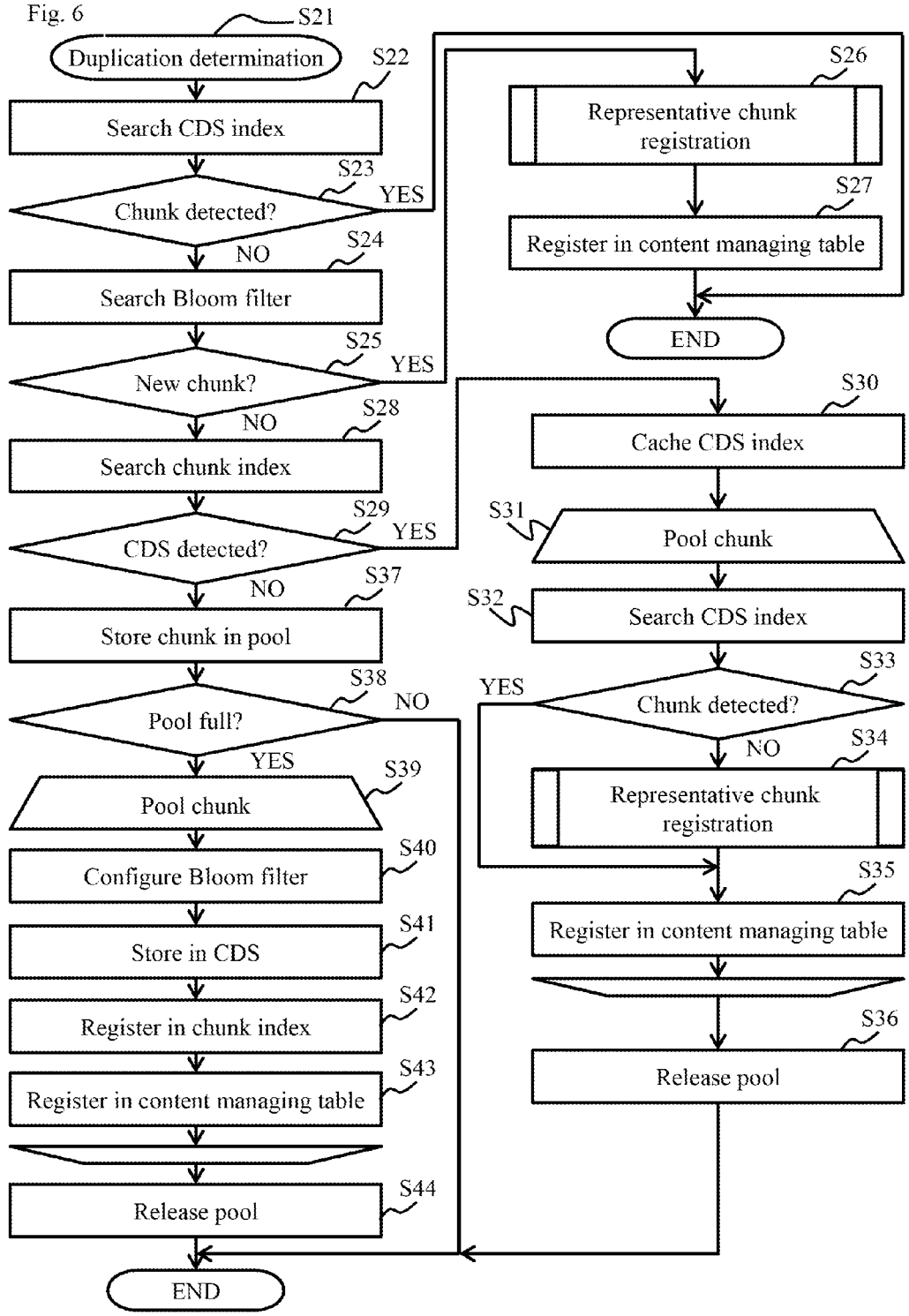
FIG. 6 is a flowchart showing details of the process for determining data duplication.

The processing shown in FIG. 4 will be explained in detail using FIGS. 6 and 7. FIG. 6 is a flowchart of the process for determining data duplication.

First, the corresponding relationship with FIG. 4 will be explained. Step S21 corresponds to Step S1, Step S22 corresponds to Step S2, a determination of "YES" in Step S23 corresponds to Step S3, Step S24 corresponds to Step S4, a determination of "YES" in Step S25 corresponds to Step S5, Step S26 and Step S27 correspond to Step S14, Step S28 corresponds to Step S6, a determination of "NO" in Step S29 corresponds to Step S7, Step S37 corresponds to Step S8, a determination of "YES" in Step S29 corresponds to Step S9, Step S30 corresponds to Step S10, Steps S31 to S36 correspond to Step S11, a determination of "YES" in Step S33 corresponds to Step S12, and a determination of "NO" in Step S33 corresponds to Step S13, respectively.

When the node 110 receives data that is the target of a data duplication determination, the program 131 starts the process (S21). The program 131 acquires the FP of the target chunk data, uses the FP to search the CDS IDX 132C in the memory 112 (S22), and determines whether or not the FP of the target chunk data exists in the CDS IDX 132C in the memory 112 (S23). The program 131, upon determining that the FP of the target chunk data exists in the CDS IDX 132C (S23: YES), ends the processing.

The program 131, upon determining that the FP of the target chunk data does not exist in the CDS IDX 132C (S23: NO), searches the Bloom filter 133 (S24) and determines whether or not the Bloom filter 133 indicates the existence of the target chunk data (S25).

As described hereinabove, the Bloom filter 133 turns ON prescribed bits corresponding to a plurality of hash values obtained by inputting the chunk data into a plurality of hash functions. Therefore, when the target chunk data exists in the storage system 10, all of the prescribed bits are invariably ON. When any one of the plurality of prescribed bits is OFF, the target chunk data does not exist in the storage system 10.

By contrast, even when all of the plurality of prescribed bits related to the one piece of chunk data are ON, this does not mean that the one piece of chunk data definitely exists in the storage system 10. When either one or a plurality of the plurality of prescribed bits for the one piece of chunk data occasionally match the prescribed bits for another piece of chunk data, there is no way of telling whether the matching prescribed bits are ON for both pieces of chunk data, or whether the matching prescribed bits are ON for one of the pieces of chunk data.

Therefore, indication by the Bloom filter 133 that the target chunk data exists indicates that there is a prescribed probability of the likelihood of existence. A false positive, which signifies that while the existence of the target chunk data is being indicated, in actuality, the target chunk data does not exist, will differ depending on the configuration of the Bloom filter 133, and, for example, is around several percent to ten or so percent. Therefore, the aforementioned prescribed probability is (1−the false positive rate).

When the Bloom filter 133 does not indicate the existence of the target chunk data (S25: YES), that is, when the determination is that the target chunk data is new chunk data, the program 131 executes a representative chunk registration process, which will be described further below (S26). The program 131, after registering the target chunk data in the content managing table 135 (S27), ends the processing.

When the Bloom filter 133 indicates the likelihood of the existence of the target chunk data (S25: NO), the program 131 searches to determine whether the FP of the target chunk data is registered in the chunk index 136 (S28). The program 131 determines whether the FP of the target chunk data is registered in the chunk index 136 (S29).

The program 131, upon determining that the FP of the target chunk data is registered in the chunk index 136 (S29: YES), transfers the CDS IDX 132C corresponding to the CDS 137 to which the target chunk data belongs from the storage part 120 to the memory 112, and stores the CDS IDX 132C in the memory 112 (S30).

The program 131 executes the following Steps S32 to S35 for all the target chunk data in the chunk pool 134 for which a duplication decision has been deferred (S31).

The program 131 uses the FP of the target chunk data in the chunk pool 134 to search the CDS IDX 132C (S32), and determines whether the FP of the target chunk data is registered in the CDS IDX 132C in the memory 112 (S33).

The program 131, upon determining that the FP of the target chunk data is not registered in the CDS IDX 132C (S33: NO), executes a representative chunk registration process (S34) that will be described further below. The processing shown in Step S34 is identical to the processing shown in Step S26.

The program 131 registers the target chunk data in the content managing table 135 (S35), and selects another piece of chunk data in the chunk pool 134 as the target chunk data. The program 131, after making determinations for all the chunk data in the chunk pool 134, deletes the chunk data from the chunk pool 134, releases the storage area in the chunk pool 134 (S36), and ends the processing.

In this way, the program 131 carries out redeterminations as to whether or not there is duplicate data for the respective target chunk data temporarily stored in the chunk pool 134, and when the target chunk data is new chunk data, stores the new chunk data in the storage part 120.

Alternatively, when the program 131 determines that the FP of the target chunk data is not registered in the chunk index 136 (S29: NO), the program 131 determines whether the chunk pool 134 is full (S38). A full chunk pool 134 signifies that the chunk pool 134 storage area has been used up to a prescribed upper limit value. Upon determining that the chunk pool 134 is not full (S38: NO), the program 131 ends the processing.

The program 131, upon determining that the chunk pool 134 is full (S38: YES), executes Steps S40 to S43 below for each piece of chunk data stored in the chunk pool 134 (S39). In the following Steps S40 to S43, the program 131 determines that the chunk data in the chunk pool 134 is new chunk data, and stores the new chunk data in the storage part 120.

The program 131 registers the target chunk data that is in the chunk pool 134 in the Bloom filter 133 (S40) and stores the target chunk data in the CDS 137 (S41). The program 131 registers the target chunk data in the CDS IDX 132 (S42), and, in addition, registers the target chunk data in the content managing table 135 as well (S43). The program 131, after storing all of the chunk data that is in the chunk pool 134 in the storage part 120 and upgrading the prescribed types of tables, deletes the chunk data from the chunk pool 134, and releases the chunk pool 134 storage area (S44).

Figure 7:
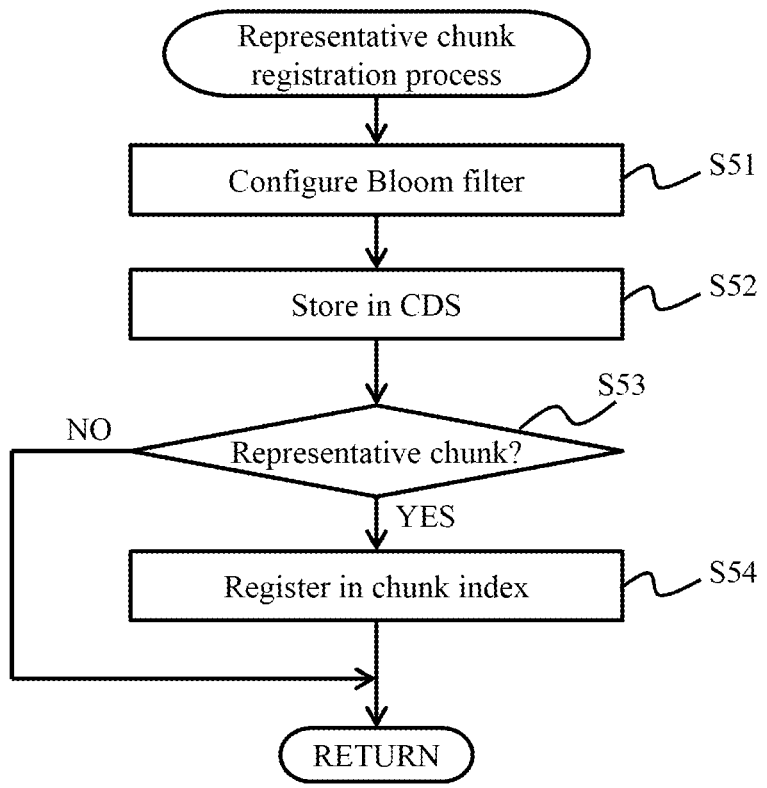

FIG. 7 is a flowchart showing the representative chunk registration process (S26, S34) of FIG. 6 in detail. The process is executed when storing new chunk data in the storage part 120.

The program 131 registers the new chunk data in the Bloom filter 133 (S51) and stores the new chunk data in the CDS 137 (S52).

The program 131 determines whether the stored target chunk data satisfies a prescribed condition as a representative chunk (S53). As a prescribed condition for becoming a representative chunk, for example, it is possible to cite a condition such as a chunk from the head of the user file up to the second chunk, or a chunk from the head of the CDS 137 up to the second chunk, or a prescribed number of chunks from the preceding representative chunk.

The program 131, upon determining that the target chunk data satisfies the condition for the representative chunk data (S53: YES), registers the target chunk data in the CDS IDX 132 (S54).

The processing in a case where a read command is received from the host computer 20 will be explained using the flowchart of FIG. 8.

The node 110, upon receiving a read command from the host computer 20 (S61: YES), determines whether the file specified in the read command has undergone deduplication processing (S62). When the file specified by the read command is a stub file, it is possible to determine that duplication processing has been completed.

The node 110, upon determining that the file specified by the read command has not undergone deduplication processing (S62: NO), reads the file specified by the read command from the storage part 120 and transfers the file to the memory 112 (S63). Thereafter, the node 110 sends the file specified by the read command to the host computer 20 and ends the processing.

By contrast, when the node 110 determines that the file specified by the read command has undergone deduplication processing (S62: YES), the node 110 refers to the content managing table 135 corresponding to the file (stub file) specified by the read command (S64).

The node 110 identifies a plurality of chunk data for constructing the file specified by the read command, and transfers the plurality of chunk data from the storage part 120 to the memory 112 (S65). The node 110 reconstructs the file from the chunk data collected in the memory 112 (S66), sends the reconstructed file to the host computer 20, and ends the processing.

According to the working example, a data duplication determination can be performed rapidly by storing only the FPs of the representative chunks in the chunk index 136.

According to the working example, target chunk data for which the FP is not stored in the chunk index 136 is not determined as being new chunk data right away, but rather, is stored temporarily in the chunk pool 134. In the working example, when the CDS IDX 132C in the memory 112 is updated, this CDS IDX 132C is used to once again make a determination as to the presence or absence of duplication with respect to the target chunk data in the chunk pool 134. Therefore, according to the working example, data duplication determination processing can be made both fast and accurate.

In addition, in the working example, when target chunk data, for which a determination made using the CDS IDX 132C in the memory 112 indicates non-existence but the Bloom filter 133 is indicating existence, is not a representative chunk, the decision for the target chunk data is temporarily deferred, and the target chunk data is stored in the chunk pool 134. In the working example, the program 131 waits for the CDS IDX 132C in the memory 112 to be updated, then uses the updated CDS IDX 132C to determine whether the target chunk data in the chunk pool 134 is already stored.

In the working example, a redetermination is made at a separate time for target chunk data for which a decision was temporarily deferred. Therefore, the presence or absence of data duplication can be accurately detected and eliminated.

In the working example, data other than target chunk data for which the existence of identical data has been negated by the Bloom filter 133, that is, only target chunk data for which the Bloom filter 133 has indicated the likelihood of existence is temporarily stored. Therefore, the chunk pool 134 can be utilized efficiently.

In the working example, when the chunk pool 134 usage has reached an upper limit value, the chunk data in the chunk pool 134 is treated as new data and stored in the storage part 120. Therefore, it is possible to prevent data duplication determinations from being delayed more than necessary, to make effective use of a limited-size chunk pool 134, and to enhance the efficiency of eliminating data duplication.

REFERENCE SIGNS LIST

1 Storage system
1A Deduplication part
1B Storage part
T1, T1C First management table
T2 Second management table
T3 Third management table
DS Data set
2 Host computer
10 Storage system
20 Host computer
110 Node
112 Memory
120 Storage part
131 Deduplication program
132 Chunk data set index (CDS IDX)
133 Bloom filter
134 Chunk pool
135 Content managing table
136 Chunk index

The invention claimed is:

1. A data duplication detection system for detecting a duplication of data, the data duplication detection system comprising:
   a data duplication determination part configured to determine whether each of a plurality of pieces of chunk data formed by dividing a received data is a duplicate of chunk data that has already been stored;
   a storage part configured to store chunk data that has been determined not to be duplicative by the data duplication determination part;
   a first management table configured to manage, for each piece of chunk data stored in the storage part, identity guarantee data that indicates a data identity, with the identity guarantee data being associated with storage-destination information that indicates a data storage destination;
   a second management table created on the basis of the identity guarantee data for the each piece of chunk data stored in the storage part, the second management table being configured to indicate with prescribed reliability that a piece of chunk data is stored in the storage part, the prescribed reliability being a probability equal to greater than a probability threshold value, the threshold value calculated based on a number of prescribed hash functions used to determine hash values for the piece of chunk data and a number of bits of a bit string that indicates the hash values at positions of the bit string corresponding to the hash values; and a third management table configured to manage a plurality of chunk data sets formed by grouping together the pieces of chunk data stored in the storage part, the third management table being configured to manage the identity guarantee data for prescribed chunk data that represents each of the plurality of chunk data sets, wherein the data duplication determination part:
  in a case where the second management table indicates that a target chunk data included in the received data is stored in the storage part, and, in addition, in a case where determination is made that the identity guarantee data for the target chunk data is not stored in the third management table, temporarily stores the target chunk data in a temporary storage part;
  in a case where the second management table indicates that a second target chunk data that differs from the target chunk data is stored in the storage part, and, in addition, in a case where determination is made that the identity guarantee data for the second target chunk data is stored in the third management table, determines whether the identity guarantee data for the target chunk data in the temporary storage part is stored in the first management table;
  in a case where determination is made that the identity guarantee data for the target chunk data stored in the temporary storage part is stored in the first management table, determines that the target chunk data stored in the temporary storage part is already stored in the storage part; and
  in a case where determination is made that the identity guarantee data for the target chunk data stored in the temporary storage part is not stored in the first management table, determines that the target chunk data stored in the temporary storage part is not stored in the storage part.

2. A data duplication detection system according to claim 1, wherein the first management table is configured to manage the chunk data for one of the plurality of chunk data sets identified by a chunk data set identifier, and the data duplication determination part, in a case where determination is made that the second target chunk data is stored in the third management table, determines whether the identity guarantee data for the target chunk data stored in the temporary storage part is stored in the first management table corresponding to the chunk data set to which the second target chunk data belongs, from among a plurality of first management tables corresponding to each of the plurality of chunk data sets identified by a corresponding chunk data set identifier.

3. A data duplication detection system according to claim 2, wherein the data duplication determination part, in a case where determination is made that the target chunk data stored in the temporary storage part is not stored in the storage part, stores the target chunk data in the storage part as new chunk data, and, in addition, updates the first management table, the second management table, and the third management table.

4. A data duplication detection system according to claim 3, wherein the data duplication determination part, in a case where the target chunk data that has been stored in the temporary storage part is stored in the storage part as the new chunk data, discards the target chunk data serving as the new chunk data stored in the temporary storage part to release a storage area in the temporary storage part.

5. A data duplication detection system according to claim 4, wherein the data duplication determination part stores in the storage part the target chunk data that has been stored in the temporary storage part as the new chunk data when the usage of the temporary storage part reaches a prescribed upper limit value.

6. A data duplication detection system according to claim 5, wherein the data duplication determination part is able to use a memory, the first management tables corresponding to each of the plurality of chunk data sets are stored in the storage part, and the first management table corresponding to the chunk data set to which the second target chunk data belongs is transferred from the storage part and stored in the memory.

7. A data duplication detection system according to claim 6, wherein the data duplication determination part:
  when receiving data, first uses the first management table in the memory and determines whether identity guarantee data of the target chunk data included in the received data is stored in the storage part;
  when determining that the identity guarantee data for the target chunk data is not stored in the first management table in the memory, determines whether the second management table indicates that the target chunk data is stored in the storage part;
  when the second management table indicates that the target chunk data is stored in the storage part, determines whether the identity guarantee data for the target chunk data is stored in the third management table; and
  when determining that the identity guarantee data for the target chunk data is not stored in the third management table, stores the target chunk data in the temporary storage part.

8. A data duplication detection system according to claim 1, comprising:
  a computer apparatus communicably connected to a host computer and the storage part, and having a microprocessor and a memory,
  wherein the data duplication determination part is realized by the microprocessor executing a prescribed data duplication determination program stored beforehand in the memory,
  wherein the data duplication determination part comprises a first determination part, a second determination part, a third determination part, and a fourth determination part,
  wherein the first determination part determines whether the identity guarantee data for the target chunk data included in the received data is stored in the first management table in the memory that is configured to manage the chunk data for one of the plurality of chunk data sets, and upon determining that the identity guarantee data is stored in the first management table in the memory, determines that the target chunk data is stored in the storage part,
  the second determination part, when the first determination part has determined that the identity guarantee data for the target chunk data is not stored in the first management table in the memory, determines whether the second management table indicates that the target chunk data is stored in the storage part, and when determining that the target chunk data is new chunk data that is not stored in the storage part, stores the new chunk data in the storage part,
  the third determination part, when the second management table indicates that the identity guarantee data for the target chunk data is stored in the storage part, determines whether the identity guarantee data for the target chunk data is stored in the third management table, and when determining that the identity guarantee data for the target chunk data is stored in the third management table, determines that the target chunk data is stored in the storage part, and upon determining that the identity guarantee data for the target chunk data is not stored in the third management table, stores the target chunk data in the temporary storage part, and the fourth determination part, when the third determination part has determined that the identity guarantee data for a second target chunk data that differs from the target chunk is stored in the third management table, transfers and stores in the memory the first management table corresponding to the chunk data set to which the second target chunk data belongs, and determines whether the identity guarantee data for the target chunk data stored in the temporary storage part is stored in the first management table in the memory, when the fourth determination part has determined that the identity guarantee data for the target chunk data is stored in the first management table in the memory, the data duplication determination part determines that the target chunk data stored in the temporary storage part is already stored in the storage part, and deletes the target chunk data from the temporary storage part, when the fourth determination part has determined that the identity guarantee data for the target chunk data is not stored in the first management table in the memory, the data duplication determination part determines that the target chunk data stored in the temporary storage part is new chunk data that is not stored in the storage part, stores the new chunk data in the storage part, and deletes the target chunk data from the temporary storage part, and when the temporary storage part usage reaches a prescribed upper limit value, the data duplication determination part stores the target chunk data stored in the temporary storage part in the storage part as the new chunk data.

9. A data duplication detection system according to claim 1, wherein, the second management table indicates that a target chunk data included in the received data is stored in the storage part when each of the bits at the positions of the bit string corresponding to the hash values indicate the hash values for the target chunk data, and the second management table indicates that a target chunk data included in the received data is not stored in the storage part when any of the bits at the positions of the bit string corresponding to the hash values do not indicate the hash values for the target chunk data.

10. A method for controlling a data duplication detection system for detecting a duplication of data, the data duplication detection system including:

a data duplication determination part configured to determine whether each of a plurality of pieces of chunk data formed by dividing a received data is a duplicate of chunk data that has already been stored;

a storage part configured to store chunk data that has been determined not to be duplicative by the data duplication determination part;

a first management table configured to manage, for each piece of chunk data stored in the storage part, identity guarantee data that indicates a data identity, with the identity guarantee data being associated with storage-destination information that indicates a data storage destination;

a second management table created on the basis of the identity guarantee data for the each piece of chunk data stored in the storage part, the second management table being configured to indicate with prescribed reliability that a piece of chunk data is stored in the storage part, the prescribed reliability being a probability equal to greater than a probability threshold value, the threshold value calculated based on a number of prescribed hash functions used to determine hash values for the piece of chunk data and a number of bits of a bit string that indicates the hash values at positions of the bit string corresponding to the hash values; and a third management table configured to manage a plurality of chunk data sets formed by grouping together the pieces of chunk data stored in the storage part, the third management table being configured to manage the identity guarantee data for prescribed chunk data that represent each of the plurality of chunk data sets, the data duplication detection system control method comprising: operating the data duplication determination part:

in a case where the second management table indicates that a target chunk data included in the received data is stored in the storage part, and, in addition, in a case where determination is made that the identity guarantee data for the target chunk data is not stored in the third management table, to store the target chunk data in a temporary storage part for temporarily storing the target chunk data;

in a case where the second management table indicates that a second target chunk data that differs from the target chunk is stored in the storage part, and, in addition, in a case where determination is made that the identity guarantee data for the other second target chunk data is stored in the third management table, to determine whether the identity guarantee data for the target chunk data stored in the temporary storage part is stored in the first management table;

in a case where the identity guarantee data for the target chunk data stored in the temporary storage part is stored in the first management table, to determine that the target chunk data stored in the temporary storage part is already stored in the storage part; and in a case where determination is made that the identity guarantee data for the target chunk data stored in the temporary storage part is not stored in the first management table, to determine that the target chunk data stored in the temporary storage part is not stored in the storage part.

11. A method for controlling a data duplication detection system according to claim 10, wherein the first management table is configured to manage the chunk data for one of the plurality of chunk data sets identified by a chunk data set identifier, and the data duplication determination part, when determining that the second target chunk data is stored in the third management table, determines whether the identity guarantee data for the target chunk data stored in the temporary storage part is stored in a first management table corresponding to the chunk data set to which the second target chunk data belongs, from among a plurality of first management tables corresponding to each of the plurality of chunk data sets identified by a corresponding chunk data set identifier.

12. A method for controlling a data duplication detection system according to claim 11, wherein the data duplication determination part, when determining that the target chunk data stored in the temporary storage part is not stored in the storage part, stores the target chunk data in the storage part as new chunk data, and, in addition, updates the first management table, the second management table, and the third management table.

13. A method for controlling a data duplication detection system according to claim 12, wherein the data duplication determination part, when storing in the storage part the target chunk data that had been stored in the temporary storage part as the new chunk data, discards the target chunk data serving as the new chunk data stored in the temporary storage part to release a storage area in the temporary storage part.

14. A method for controlling a data duplication detection system according to claim 13, wherein the data duplication determination part stores in the storage part the target chunk data that is stored in the temporary storage part as the new chunk data when the temporary storage part usage reaches a prescribed upper limit value.

* * * * *